United States Patent [19]

Holm

[11] 4,011,908
[45] Mar. 15, 1977

[54] MICELLAR FLOODING PROCESS FOR RECOVERING OIL FROM PETROLEUM RESERVOIRS

[75] Inventor: LeRoy W. Holm, Fullerton, Calif.

[73] Assignee: Union Oil Company of California, Brea, Calif.

[22] Filed: May 6, 1975

[21] Appl. No.: 575,020

Related U.S. Application Data

[63] Continuation-in-part of Ser. No. 376,530, July 5, 1973, abandoned, and a continuation-in-part of Ser. No. 466,540, May 3, 1974, abandoned.

[52] U.S. Cl. .............................................. 166/273
[51] Int. Cl.² ....................................... E21B 43/22
[58] Field of Search ................ 166/273, 274, 275

[56] References Cited

UNITED STATES PATENTS

| | | | |
|---|---|---|---|
| 3,261,399 | 7/1966 | Coppel | 166/273 |
| 3,266,570 | 8/1966 | Gogarty | 166/273 |
| 3,324,944 | 6/1967 | Poettmann | 166/273 |
| 3,330,344 | 7/1967 | Reisberg | 166/273 |
| 3,343,597 | 9/1967 | Gogarty et al. | 166/274 |
| 3,414,053 | 12/1968 | Treiber et al. | 166/273 |
| 3,507,331 | 4/1970 | Jones | 166/273 |
| 3,512,586 | 5/1970 | Holm | 166/273 |
| 3,537,520 | 11/1970 | Holm | 166/273 |
| 3,605,894 | 9/1971 | Jones | 166/273 |
| 3,670,819 | 5/1972 | Dauben et al. | 166/273 |
| 3,777,817 | 12/1973 | Feuerbacher et al. | 166/273 |
| 3,871,452 | 3/1975 | Sarem | 166/273 |
| 3,871,453 | 3/1975 | Sarem | 166/273 |

*Primary Examiner*—Ernest R. Purser
*Attorney, Agent, or Firm*—Richard C. Hartman; Dean Sandford; John E. Vanderburgh

[57] ABSTRACT

A process for recovering oil from subterranean petroleum reservoirs in which there are successively injected into the reservoir (1) an aqueous alkaline alkali metal silicate solution, (2) a micellar solution, and (3) an aqueous drive fluid; and wherein oil is recovered from one or more production wells spaced apart in the reservoir from the injection well. The micellar solution can be a substantially anhydrous soluble oil, a soluble oil containing water present in the form of a water-in-oil microemulsion, a water-external microemulsion, or an aqueous micellar surfactant solution. Additionally, the micellar solution can be a substantially anhydrous soluble oil or a soluble oil containing water present in the form of a water-in-oil microemulsion followed by a water-external microemulsion.

20 Claims, No Drawings

MICELLAR FLOODING PROCESS FOR RECOVERING OIL FROM PETROLEUM RESERVOIRS

This is a continuation-in-part of application Ser. No. 466,540 filed May 3, 1974, now abandoned, which was a continuation-in-part of application Ser. No. 376,530 filed July 5, 1973, now abandoned.

This invention relates to the recovery of oil from subterranean petroleum reservoirs, and more particularly to an improved micellar solution flooding process for the recovery of petroleum from subterranean reservoirs.

It has long been recognized that substantial amounts of oil remain unrecovered in the reservoir at the completion of normal primary recovery operations. Hence, various secondary methods of recovering additional quantities of oil have been proposed, such as the well-known technique of water flooding in which water is injected into the reservoir through an injection well to drive additional oil toward one or more production wells spaced apart in the reservoir from the injection well. Although an additional quantity of oil often can be recovered by waterflooding, the efficiency of the waterflood and the ultimate oil recovery can be further improved by introducing into the reservoir ahead of the flood water a solvent that is miscible with both the connate oil and with the flood water.

It is known that various micellar solutions such as substantially anhydrous soluble oils and soluble oils containing water present in the form of a water-in-oil microemulsion can be employed as the solvent in a miscible-flood water drive process. These soluble oils are generally admixtures of a liquid hydrocarbon, one or more surface active agents, and a stabilizing agent, and can contain water in an amount up to the concentration at which the water-in-oil microemulsion inverts to an oil-in-water emulsion. A wide variety of liquid hydrocarbons such as liquefied petroleum gas (LPG), gasoline, mineral oil, lubricating oil, lubricating oil extract, and other refinery byproduct oils, crude petroleum, and the like, can be employed as the liquid hydrocarbon base. Other micellar solutions that can be employed as the miscible displacement fluid in a flooding operation are water-external microemulsions and aqueous surfactant systems in which the surfactant is present in the form of macromolecular micelles.

While these flooding processes employing micellar solutions to miscibly displace oil from the reservoir can obtain high oil recoveries under controlled laboratory conditions, it has been found that the recoveries obtainable under actual field conditions are substantially lower, and in some cases are reduced to the extent that the recovery operation is uneconomical. One major factor in the reduced recovery efficiency is that the previously employed micellar solutions are incompatible with the mineral salts in the reservoir, which often contain substantial amounts of monovalent and polyvalent salts, and particularly divalent salts such as the water-soluble salts of calcium, magnesium and barium. Tests have shown that reservoirs containing brines having more than about 0.15 weight percent of divalent metal ions are particularly deleterious, in that, upon contacting the micellar solution, the micellar dispersion is adversely affected resulting in the formation of macroemulsions and separate immiscible phases that are not efficient miscible displacement fluids. Also, the divalent metal sulfonates, such as the calcium sulfonates formed by reaction of the monovalent metal sulfonates with divalent metal ions, are less soluble and tend to be precipitated or held on the surface of the rock. Another major effect of the polyvalent metal ions on these recovery processes, is that these ions, and particularly the divalent metal ions, adversely affect the water-soluble polymers conventionally employed to decrease the mobility of the flood water used to displace the micellar solution through the reservoir.

In the displacement process, the brine is mobilized ahead of the micellar solution and may only contact the leading edge of the micellar solution bank. If the connate brine is the only source of the polyvalent metal cations, this deleterious effect could be compensated for by injecting an additional small amount of micellar solution or a preslug of fresh water ahead of the micellar solution. However, most clayey constituents of the reservoir rock contain enough exchangeable divalent metal cations, such as calcium, magnesium and barium ions, to materially affect the efficiency of the displacement process. On contact with the micellar solution, these polyvalent cations are exchanged with monovalent cations in the solution. In many reservoirs, the amounts of polyvalent metal ions available for exchange is so great that any practical amount of micellar solution injected into the reservoir would pick up enough polyvalent metal ions to adversely affect the oil recovery efficiency. Reservoir heterogeneity is another factor adversely affecting the efficiency of the oil recovery process, particularly where dissolved polyvalent metal ions are present in the connate water. By "heterogeneous" it is meant that the reservoir is comprised of stratified layers of varying permeability, which can be of microscopic thickness, or that it contains fractures, cracks, fissures, streaks, vuggs, or zones of varying permeability that cause injected fluids to advance through the reservoir nonuniformly and promote mixing of the fluids within the reservoir. Because of this mixing, connate water containing the detrimental polyvalent metal ions may adversely affect more than just the leading edge of the injected micellar solution.

Also, various constituents of the reservoir rock are anion adsorbents and tend to adsorb anionic surfactants from the micellar solution and the anionic polymers used to control the mobility of the flood water. Adsorption of one or both of these agents adversely affects the efficiency of the oil recovery process.

Thus, need exists for a method for improving the efficiency of the micellar solution-waterflood process to provide high oil recoveries even under adverse reservoir conditions.

Accordingly, a principal object of this invention is to provide a micellar solution flooding process for recovering oil from subterranean petroleum reservoirs.

Still another object of the invention is to provide a micellar solution flooding process for recovering increased amounts of oil from subterranean petroleum reservoirs containing deleterious amounts of dissolved polyvalent metal salts.

Yet another object of the invention is to provide a micellar solution flooding process for recovering oil from a petroleum reservoir in which the reservoir rock contains cation-exchangeable divalent cations.

A further object of the invention is to provide a method for minimizing or avoiding the deleterious effect of high concentrations of polyvalent metal ions upon a micellar solution injected into a subterranean reservoir in carrying out a micellar solution flooding operation.

A still further object of the invention is to provide a micellar solution flooding process for recovering oil from a petroleum reservoir which achieves increased oil recovery under actual reservoir conditions.

Other objects and advantages of the invention will be apparent from the following description.

Briefly, this invention contemplates a process for recovering oil from subterranean petroleum reservoirs in which there are successively injected into the reservoir (1) an aqueous alkaline alkali metal silicate solution, (2) a micellar solution, and (3) an aqueous drive fluid; and wherein oil is recovered from one or more production wells spaced apart in the reservoir from the injection well. The micellar solution can be a substantially anhydrous soluble oil, a soluble oil containing water present in the form of a water-in-oil microemulsion, a water-external microemulsion, or an aqueous micellar surfactant solution. The micellar solution can also be a substantially anhydrous soluble oil or a soluble oil containing water present in the form of a water-in-oil microemulsion followed by a water-external microemulsion. It has been found that pretreatment of the reservoir with alkali metal silicate prior to injection of the micellar solution provides a high recovery efficiency, even when employed to recover oil from heterogeneous, anion-adsorptive reservoirs containing high concentrations of divalent metal ions.

More specifically, this invention involves a flooding process for use in reservoirs in which oil is displaced from a subterranean oil-bearing reservoir by a micellar solution. In the practice of the invention, a small slug of an aqueous alkaline solution of alkali metal silicate is injected into the reservoir through one or more injection or input wells penetrating the oil-bearing formation and followed by the injection of a slug of micellar solution. These fluids are driven through the reservoir by a subsequently injected aqueous flooding medium which displaces them toward at least one production or output well similarly completed in the reservoir. As the flooding medium passes through the reservoir, it displaces residual oil therein and moves it into the producing well whereupon the oil can be recovered by conventional means. The injection and production wells can be arranged in any convenient pattern designed to achieve maximum contact of the oil-bearing zones by the advancing flood front; such as the conventional "five-spot" pattern wherein a central producing well is surrounded by four somewhat symmetrically located injection wells. Another of the conventional flooding patterns that can be employed in the practice of this invention is the "line drive" pattern in which the injection wells are arranged in a line so that the injected flooding medium advances through the formation to displace oil toward one or more spaced production wells that can also be arranged in a line substantially parallel to the line of injection wells.

The aqueous alkaline alkali metal silicate solutions employed in the pretreatment step are relatively dilute aqueous alkaline solutions of an alkali metal silicate, such as the silicates of sodium, potassium, lithium, cesium and rubidium, with the sodium and potassium silicates being preferred, and the sodium silicates being especially preferred. The alkali metal silicates comprise a group of chemical compounds which vary in the amount and proportions of alkali metal oxide, silica and water. These compositions are conventionally defined by the ratio of the alkali metal oxide and silica, $M_2O/SiO_2$, wherein M is an alkali metal atom, such as sodium, potassium, lithium, cesium and rubidium, and usually exhibit $M_2O/SiO_2$ ratios in the range of 0.25 to 2; and the $M_2O/SiO_2$ ratios of aqueous alkali metal silicate solutions are typically in the range of 0.25 to 4. The dilute aqueous silicate solution preferably contains less than about 5 weight percent silicate, and preferably between about 0.1 to 3 weight percent. At higher concentrations, alkali metal silicates form gels and semisolid systems. The aqueous alkali metal silicate solutions employed in the pretreating step are sufficiently dilute that gel formation does not occur.

The particularly preferred group of alkali metal silicate solutions for use in the pretreating step are the alkaline alkali metal silicate solutions having a molar ratio of 1 and above, such as a ratio of about 1 to 4, exemplary of which are solutions containing alkali metal orthosilicate, alkali metal metasilicate, alkali metal metasilicate pentahydrate, and alkali metal sesquisilicate. Particular solutions especially useful in the practice of this invention are alkaline sodium and potassium silicate solutions having a $Na_2O/SiO_2$ or $K_2O/SiO_2$ ratio between about 1 and 4, exemplary of which are solutions containing sodium and potassium orthosilicate, sodium and potassium metasilicate, sodium and potassium metasilicate pentahydrate, and sodium and potassium sesquisilicate. A particularly preferred group of pretreating solutions are those having $M_2O/SiO_2$ molar ratios of from about 1.5 to 2.5, and more particularly about 1.5 to 2.0, and especially about 2.0.

Aqueous alkaline alkali metal silicate solutions having $M_2O/SiO_2$ molar ratios of up to 2, such as from about 1 to 2, can be made by admixing an alkali metal silicate having the desired $M_2O/SiO_2$ ratio with water. Alternatively, solutions having $M_2O/SiO_2$ ratios of between about 1 and 4 can be made by admixing an alkali metal silicate having a lower than desired $M_2O/SiO_2$ ratio with a sufficient amount of an alkali metal hydroxide, such as sodium hydroxide, so as to provide the solution with the desired $M_2O/SIO_2$ molar ratio.

The micellar solution injected to miscibly displace oil from the reservoir can be an anhydrous or substantially anhydrous soluble oil, a water-containing soluble oil, a water-external microemulsion, or an aqueous micellar solution.

It is well-known that some of the ingredients from which soluble oils are compounded, such as the hydrocarbon component, the stabilizing agent, and the petroleum sulfonates, can contain minor proportions of water, and that it is difficult and costly to dehydrate these agents to remove all traces of water. Also, it may be advantageous when compounding the soluble oil to add a small amount of water to the composition. Thus, it is within the scope of this invention to employ anhydrous and substantially anhydrous soluble oils as the miscible displacement agent. The term "substantially anhydrous" as used herein is meant to include soluble oils having not more than minor amounts of water. More particularly, these soluble oils contain less than 10 volume percent water, and preferably less than 5 volume percent water. In any event, the substantially anhydrous soluble oils are to be distinguished from microemulsions containing substantial quantities of water, such as from about 10 to 50 percent or more water.

The water-containing soluble oils are oil-external microemulsions and can contain water in an amount up to the inversion concentration, i.e., that concentration of water at which the oil-external microemulsion is inverted to a water-external microemulsion. Inversion typically occurs at water concentrations between about 40 and 70 percent, depending upon the particular composition and the ambient conditions.

The water-external microemulsions are aqueous systems containing oil dispersed in the form of a microemulsion. Water-external microemulsions typically contain more than about 40 volume percent water, and usually more than about 60 volume percent. These micellar solutions exhibit many of the properties of the water-containing soluble oils, and can be efficient miscible displacement agents.

The aqueous micellar solutions are aqueous systems, substantially free of oil, in which the surface active agents are present in the form of macromolecular micelles.

The micellar solutions can have either an oleaginous or aqueous external phase, and water or oil, respectively, can be present as a dispersed phase. The oleaginous compositions, such as the soluble oils and water-containing soluble oils, are miscible with the reservoir oil and have the capability of spontaneously emulsifying water when admixed therewith. These oil-external micellar solutions comprise admixtures of a liquid hydrocarbon, one or more selected surface active alkyl aryl sulfonates, and a minor proportion of an organic liquid stabilizing agent. The emulsions formed by the addition of water to the soluble oil are of the water-in-oil type in that at water concentrations less than the inversion concentration, oil is the continuous phase and the water is dispersed in the oil in the form of very fine droplets, or micelles, which are less than 0.1 micron in size and usually range in size from about 100 to 600 A. These emulsions are generally transparent in appearance, and are stable in that they remain as microemulsions on aging. By transparent, it is meant that the microemulsions do not have a cloudy or opaque appearance, even though they may contain color bodies. It is recognized of course, that some cloudiness may appear at certain concentrations without adversely affecting the utility of the microemulsions as miscible displacement agents. Emulsions of this type are designated microemulsions to distinguish them from ordinary water-in-oil macroemulsions in which the lower limit of particle size of the water droplets is about 0.1 micron. At water concentrations above the inversion concentration, the emulsion inverts to an emulsion of the oil-in-water type in which droplets of oil are dispersed in a continuous water phase.

Similarly, the aqueous micellar solutions, such as the water-external microemulsions and aqueous micellar surfactant solutions, are miscible with water and have the capability of spontaneously emulsifying oil when admixed therewith. These water-external micellar solutions comprise water and one or more surface active agents in an amount that exceeds the critical micelle concentration, and can optionally include a minor proportion of an organic liquid stabilizing agent. The emulsions formed by the addition of oil to the aqueous micellar dispersion are of the oil-in-water type in that at oil concentrations less than the inversion concentration, water is the continuous phase and the oil is dispersed in the water in the form of droplets, or emulsions, which can be either macroemulsions or thermodynamically stable microemulsions. At oil concentrations above the inversion concentration, the oil-in-water emulsion inverts to an emulsion of the water-in-oil type in which droplets of water are dispersed in a continuous oil phase.

Surface active materials which can be used are those that when admixed with the liquid hydrocarbon cause the formation of microemulsions at surfactant concentrations above the critical micelle concentration. Agents which exhibit this property can be defined by their hydrophilic-lipophilic balance and by their spreading coefficients. The hydrophilic-lipophilic balance is an indication of the size and strength of the hydrophilic, or water-loving, or polar groups, and the lipophilic, or oil-loving, or non-polar groups in a surfactant material expressed by a numerical value designated HLB number. The spreading coefficient is an indication of the facility with which one liquid spreads upon another liquid. Spreading coefficients greater than 0 indicate that the first liquid will spread on the second, and coefficients less than 0 indicate that the supernatant liquid will simply form floating lenslike drops. Accordingly, surface active materials possessing the ability to spontaneously emulsify water in oil exhibit average HLB number of about 3 to 7, and the most negative spreading coefficient consistent with the system.

A number of surface active materials that exhibit the ability to spontaneously emulsify oil and water to produce microemulsions are commercially available. Among the preferred agents are various preferentially oil-soluble anionic surfactants such as the higher alkyl aryl sulfonates. A particularly preferred surface active agent is an alkyl aryl monosulfonate prepared by sulfonation of an aromatic petroleum fraction. These sulfonates are preferably in the form of their sodium salts, however, other salts can be used.

It has been found that superior micellar solution compositions can be prepared by employing as the surface active agent a combination of preferentially oil-soluble organic sulfonates and preferentially water-soluble organic sulfonates.

The preferentially oil-soluble surfactant material is an oil-soluble, relatively water-insoluble organic sulfonate that exhibits substantially greater solubility in oil than in water. Some of the preferentially oil-soluble organic sulfonates useful in the practice of this invention are almost completely insoluble in water, while others exhibit limited water solubility, particularly at elevated temperatures. Even though the preferentially oil-soluble organic sulfonates may exhibit some water solubility, they are nevertheless characterized by markedly greater solubility in oil. The preferentially water-soluble surfactant material is a water-soluble, relatively oil-insoluble organic sulfonate that exhibits substantially greater solubility in water than in oil. Some of these preferentially water-soluble organic sulfonates are almost completely insoluble in oil, while others exhibit limited oil solubility, particularly at elevated temperatures. Even though the preferentially water-soluble organic sulfonates may exhibit some oil solubility, they are nevertheless characterized by markedly greater solubility in water.

One class of preferentially oil-soluble organic sulfonates particularly useful in the practice of this invention is the oil-soluble alkyl aryl sulfonates that contain only one sulfonic group attached to an alkyl aryl hydrocarbon. The preferentially oil-soluble alkyl aryl sulfonates are those which in the form of their sodium salts have average molecular weights of more than about 400. Among the preferred preferentially oil-soluble organic sulfonates are alkyl sodium benzene sulfonates and alkyl sodium polyaryl sulfonates having molecular weight of more than about 400. The preferred preferentially water-soluble organic sulfonates include water-soluble alkyl aryl sulfonates. The water-soluble alkyl aryl sulfonates are generally those which in the form of their sodium salts have average molecular weights of less than about 400 or which contains more than one sulfonic acid group per molecule, i.e., the preferred water-soluble sulfonates are monosulfonates or polysulfonates which in the form of their sodium salts have average equivalent weights of less than about 400. It has been found that in soluble oils compounded from petroleum crude oil or other high boiling hydrocarbons, superior results are obtained by employing as the preferentially oil-soluble organic sulfonate an alkyl aryl sulfonate which in the form of its sodium salt has an average molecular weight above about 450, and preferably in the range of about 450 to 550.

Thus, the micellar solutions used in the practice of this invention are prepared by admixing a preferentially oil-soluble organic sulfonate, such as an alkyl aryl sulfonate or mixture of sulfonates which in the form of their sodium salts have average molecular weights of more than about 400, and a preferentially water-soluble organic sulfonate, such as an alkyl aryl monosulfonate or mixture of monosulfonates which in the form of their sodium salts have molecular weights of less than about 400 or such as alkyl aryl polysulfonates having average equivalent weights of less than about 400. Alternatively, a mixture of preferentially water-soluble and preferentially oil-soluble sulfonates can be employed, such as a mixture of alkyl aryl sulfonates which in the form of the sodium salt have an average molecular weight in the range of about 400 to 500 and which include both preferentially oil-soluble and preferentially water-soluble sulfonates.

The preferentially oil-soluble alkyl aryl sulfonates and preferentially water-soluble alkyl aryl sulfonates useful in the practice of this invention can be prepared by sulfonating an appropriate alkyl aryl hydrocarbon or mixture of hydrocarbons. Thus, a preferred preferentially oil-soluble alkyl aryl sulfonate can be prepared by sulfonating an alkyl aryl hydrocarbon to yield an alkyl aryl sulfonate which in the form of its sodium salt has a molecular weight of more than about 400. The preferred preferentially water-soluble alkyl aryl sulfonates are prepared by selecting the alkyl aryl hydrocarbon so that when sulfonated, the resulting alkyl aryl sulfonate in the form of its sodium salt has a molecular weight of less than about 400, or by sulfonating sufficiently to form polysulfonates. These sulfonates are preferably in the form of the sodium salt, however other salts can be used, such as the salts of other alkali metals and ammonium salts.

A readily available source of alkyl aryl sulfonates are the natural petroleum sulfonates produced by sulfonating a relatively narrow boiling range mixture of petroleum hydrocarbons. Depending upon the boiling range of the hydrocarbon fraction, on sulfonation, mixture of alkyl aryl monosulfonates are produced which may be either preferentially water-soluble or preferentially oil-soluble. The term "natural petroleum sulfonates" is a commercial designation of petroleum sulfonates which are obtained by a treatment of petroleum fractions, particularly solvent treated aromatic fractions, with sulfuric acid, fuming sulfuric acid or sulfur trioxide. Upon sulfonation, two types of general products are formed which are designated mahogany acid sulfonates and green acid sulfonates. The terminology is based on the colors imparted to the sulfonates in solution, a brownish color being imparted to the sulfonates which remain in the oil and the greenish color imparted to aqueous solutions made from the acid sludges formed in the sulfonation process. The mahogany sulfonates are preferentially oil-soluble and the green sulfonates are preferentially water-soluble.

The mahogany sulfonates are alkyl aryl sulfonates which usually contain only one sulfonic group per molecule and both the green and the mahogany types contain mixtures of sulfonates of varying molecular weights with the mahogany, or oil-soluble sulfonates generally containing the sulfonates of higher molecular weights. The green sulfonates, or water-soluble sulfonates, contain the sulfonates of lower molecular weight or those containing more than oen sulfonate group per molecule.

The preferentially oil-soluble surface active material and the preferentially water-soluble surface active material are employed in the proportions of about 1 part of preferentially oil-soluble agent per part of water-soluble agent to about 15 parts of oil-soluble agent per part of water-soluble agent, or more preferably to about 12 parts of oil-soluble agent per part of water-soluble agent. That is, the soluble oil compositions of this invention contain between about 1 to 15, or 1 to 12 parts of preferentially oil-soluble sulfonate per part of preferentially water-soluble sulfonate. Although the optimum surfactant combination is dependent upon the characteristics of the particular reservoir, in many operations it is found that superior results are obtained with a surfactant combination containing about 1 to 4 parts of preferentially oil-soluble surface active material per part of preferentially water-soluble surface active material; and more particularly, with a surfactant mixture containing about 2 parts of preferentially oil-soluble agent per part of preferentially water-soluble agent.

The various stabilizing agents that can be admixed with the micellar solution to improve the properties and stability of the resulting microemulsions formed upon the oleaginous or aqueous micellar solution contacting either water or oil, respectively, include partially oxygenated hydrocarbons such as monohydric and polyhydric alcohols, ketones, ethers, polyhydric alkyl ethers, and oxyalkylated alcohols. More specifically, the stabilizing agents are monohydric aliphatic alcohols having 3 to 5 carbon atoms, dihydric aliphatic alcohols containing 2 to 3 carbon atoms, aliphatic ketones containing 4 to 6 carbon atoms, glycol ethers containing 4 to 10 carbon atoms, dialkylene glycols containing 4 to 6 carbon atoms, and oxyalkylated alcohols containing 8 to 18 carbon atoms. Exemplary monohydric alcohols include propyl alcohol, isopropyl alcohols, n-butyl alcohol, isobutyl alcohol, secondary butyl alcohol, tertiary butyl alcohol, normal amyl alcohol, secondary amyl alcohol, and tertiary amyl alcohol. Exemplary polyhydric aliphatic alcohols include ethylene glycol, 1,3-propanediol, and 1,2-propanediol. Exemplary aliphatic ketones include methyl ethyl ketone, diethyl ketone and methyl isobutyl ketone. Exemplary glycol ethers include ethylene glycol monoethyl ether (Cellosolve solvent), ethylene glycol monobutyl ether (butyl Cellosolve solvent), diethylene glycol monobutyl ether (butyl Carbitol solvent), diethylene glycol monoethyl ether (Carbitol solvent), diethylene glycol hexyl ether (hexyl Carbitol solvent), and ethylene glycol hexyl ether (hexyl Cellosolve solvent). The terms, "Cellosolve" and "Carbitol," are trademarks of the Union Carbide Corporation. Exemplary dialkylene glycols include diethylene glycol and dipropylene glycol. Exemplary oxyalkylated alcohols are those in which the water-soluble portions and the oil-soluble portions are balanced so that the oxyalkylated alcohol is about as water-soluble as it is oil-soluble; such as diethoxylated butyl alcohol, propoxylated propyl alcohol, and butoxylated butyl alcohol. Specific agents found particularly useful include isopropyl alcohol, secondary butyl alcohol, methyl ethyl ketone, ethylene glycol monoethyl ether, ethylene glycol monobutyl ether, diethylene glycol monobutyl ether, and diethylene glycol hexyl ether. A specific oxyalkylated alcohol found useful is hexaethoxylated hexyl alcohol.

One of the major constituents of the oleaginous miscellar solutions and the water-external microemulsions is a liquid hydrocarbon. The particular liquid hydrocarbon employed in formulating a soluble oil in part determines the viscosity and other properties of the soluble oil, and the mobility of the soluble oil in the reservoir, which affect the efficiency of the oil recovery process. Suitable liquid hydrocarbons include crude petroleum, such as petroleum previously recovered from the reservoir, or other conveniently available crude petroleum; distillate petroleum fractions such as refined or semi-refined petroleum products, such as gasoline, naphtha, stove oil, diesel and gas oil; residual products obtained by the distillation of lower boiling fractions from a crude petroleum, such as bunker fuel oil and other residual products; and low value refinery by-products, such as catalytic cycle oil, lube oil extract, and the like; and liquefied normally gaseous hydrocarbons, such as propane, butane and LPG. While soluble oils and water-external microemulsions can be prepared from any of these hydrocarbon materials, in many applications it is preferred to employ soluble oils compounded with crude petroleum, and particularly with crude petroleum having an API gravity between about 27° and 50°.

The micellar solution compositions of this invention can be prepared by any of the conventional techniques. One suitable method is to prepare a substantially anhydrous soluble oil by admixing the hydrocarbon base stock, the stabilizing agent and the preferentially oil-soluble surface active material. Thereafter, the preferentially water-soluble surface active material, if used, is added. Water-in-oil microemulsions can be prepared by simply adding a desired amount of water to the substantially anhydrous soluble oil, or larger amounts of water can be added to form a oil-in-water microemulsion. The aqueous micellar surfactant solution can be prepared by simply admixing suitable proportions of water, the selected surfactant, and optionally, an organic stabilizing agent. Preferably, the water employed in forming the microemulsion is a salt-containing fresh water having a dissolved salt content of less than about 15,000 ppm, and more preferably less than about 5,000 ppm. Water-soluble salts of a monovalent metal can be added to obtain a water having a desired salt content.

The oleaginous micellar solutions employed as the miscible displacement fluid comprise a mixture of about 30 to 90 volume percent of liquid hydrocarbon, such as crude petroleum; 0.5 to 8 volume percent of stabilizing agent, such as one of the above-described partially oxygenated organic liquids, or a mixture of these liquids; and 4 to 30 volume percent of surface active alkyl aryl sulfonates, and preferably surface active materials containing both preferentially oil-soluble and preferentially water-soluble organic sulfonates in the previously disclosed proportion. These oleaginous micellar solutions can contain water present in the form of water-in-oil microemulsion in an amount up to that amount causing inversion to an oil-in-water emulsion, which is typically at least about 50 volume percent. Also, where the liquid hydrocarbon has a relatively high viscosity, an additional quantity of low viscosity, light liquid hydrocarbon can be added to increase the mobility of the resulting soluble oil to obtain a more favorable mobility ratio between the soluble oil and the following drive fluid. The light hydrocarbon will usually not constitute more than about 25 volume percent of the resulting soluble oil.

The aqueous micellar solutions useful as miscible displacement fluids comprise a mixture of about 75 to 98 volume percent water and 2 to 25 volume percent of surface active alkyl aryl sulfonates, and preferably surface active materials containing both preferentially oil-soluble and preferentially water-soluble organic sulfonates in the previously disclosed proportions. These aqueous micellar solutions can contain oil present in the form of an oil-in-water emulsion in an amount up to that amount causing inversion to a water-in-oil emulsion, which is typically at least about 25 volume percent. Also, the aqueous micellar solution can optionally contain about 0.5 to 8 volume percent of an organic stabilizing agent.

In the practice of the oil recovery method of this invention, about 0.01 to 0.5 pore volume, and preferably from about 0.05 to 0.3 pore volume of aqueous alkaline alkali metal silicate solution is injected into the reservoir through one or more injection wells. Next, the micellar solution is injected in an amount sufficient to establish in the reservoir a bank which can be displaced through the reservoir. Satisfactory oil recoveries can usually be obtained by the injection of 0.01 to 0.15 reservoir pore volume of micellar solution. Aqueous flooding medium is then injected to displace the micellar solution toward at least one production well spaced apart in the reservoir, from which fluids are produced in conventional manner. The aqueous flooding medium can comprise water or brine, and can be made more viscous by the addition of a thickening agent such as sugar, dextran, carboxymethyl cellulose, amines, glycerine, guar gum, and mixtures of these agents. Also, the aqueous flooding medium can be rendered more viscous by the addition of a small amount of a water-soluble polymer, such as hydroxyethyl cellulose or polyacrylamide, and particularly a partially hydrolyzed polyacrylamide. In a preferred method of practicing this invention, thickening agent is added to only an initial portion of the flood water. Thus, in this preferred embodiment, after pretreatment with the aqueous alkaline alkali metal silicate solution, 0.01 to 0.15 reservoir pore volume of micellar solution is injected into the reservoir and followed by 0.1 to 0.8 reservoir pore volume of thickened aqueous flooding medium. Thereafter, water or brine is injected to drive the previously injected fluids toward at least one spaced production well.

In one preferred mode of practicing the invention, 0.01 to 0.15 pore volume of substantially anhydrous soluble oil is injected into the formation and followed directly by the injection of low-salt content water in an amount not exceeding the volume of soluble oil injected, or these fluids can be injected as a series of alternate slugs of substantially anhydrous soluble oil and low-salt content water. The injected fluid are displaced through the formation by injecting a substantially large volume of thickened aqueous flooding medium followed by flood water or brine.

The term "low-salt content water" is meant to include fresh water having a low-salt content, and more particularly fresh water having less than 1.0 weight percent total dissolved salts. Further, it is preferred that the low-salt content water contain less than 0.6 weight percent (6,000 ppm) of total dissolved salts. Also, the salts of polyvalent metals, such as calcium and magnesium, are particularly detrimental and it is preferred that the low-salt content water have a low polyvalent metal salt content. In particular, it is preferred that this water contain less than 0.1 weight percent (1,000 ppm) salts of polyvalent metals, and more preferably, less than 0.01 weight percent (100 ppm) of these salts.

Another preferred mode of practicing this invention comprises injecting as the micellar solution a slug of oleaginous micellar solution followed by a slug of a water-external microemulsion.

The water-external microemulsion useful in following the oleaginous micellar solution comprises a mixture of about 75 to 90 volume percent water and 2 to 20 volume percent of surface active alkyl aryl sulfonates, and preferably surface active materials containing both preferentially oil-soluble and preferentially water-soluble organic sulfonates in the previously disclosed proportions. The water-external microemulsion can contain oil present in the form of an oil-in-water emulsion in an amount up to that amount causing inversion to a water-in-oil emulsion, which is typically at least about 25 volume percent. Also, the water-external microemulsion can optionally contain up to about 8 volume percent of an organic stabilizing agent and preferably about 0.5 to 8 volume percent. And, where the mobility of the water-external microemulsion is greater than the preceding oleaginous micellar slug, it can be made less mobile by the addition of a thickening agent, such as sugar, dextran, carboxymethyl cellulose, amines, glycerine, guar gum, and mixtures of these agents. Also, the water-external microemulsion can be rendered less mobile by the addition of a small amount of a water-soluble polymer, such as hydroxyethyl cellulose or polyacrylamide, and particularly a partially hydrolyzed polyacrylamide.

In the practice of this embodiment of the invention, about 0.01 to about 0.5 pore volume, and preferably from about 0.05 to 0.3 pore volume, and even more preferably from about 0.05 to 0.15 pore volume, of an aqueous alkali metal silicate solution is injected into the reservoir through one or more injecton wells. Next, about 0.005 to about 0.05 pore volume, and preferably less than about 0.03 pore volume, of an oleaginous micellar solution is injected into the reservoir to establish an oleaginous bank which can be displaced through the reservoir. Next, the water-external microemulsion is injected in an amount between about 0.005 to about 0.05 pore volume, and preferably about 0.01 to about 0.03 pore volume. Satisfactory oil recoveries can usually be obtained by the injection of a total of 0.02 to 0.06 reservoir pore volume of micellar solution. Aqueous flooding medium is then injected to displace the micellar solutions toward at least one production well spaced apart in the reservoir, from which fluids are produced in conventional manner. The aqueous flooding medium can comprise water or brine, and can be made more viscous by the addition of a thickening agent such as sugar, dextran, carboxymethyl cellulose, amines, glycerine, guar gum, and mixtures of these agents. Also, the aqueous flooding medium can be rendered more viscous by the addition of a small amount of a water-soluble polymer, such as hydroxyethyl cellulose or polyacrylamide, and particularly a partially hydrolyzed polyacrylamide. In a preferred method of practicing this invention, thickening agent is added to only an initial portion of the flood water. Thus, in this preferred embodiment, after pretreatment with the aqueous alkali metal silicate solution, 0.01 to 0.1 reservoir pore volume of the micellar solution is injected into the reservoir and followed by 0.1 to 0.8 reservoir pore volume of thickened aqueous flooding medium. Thereafter, water or brine is injected to drive the previously injected fluids toward at least one spaced production well.

In one preferred mode of practicing this embodiment of the invention, 0.005 to 0.03 pore volume of substantially anhydrous soluble oil is injected into the formation and followed directly by the injection of low-salt content water in an amount not more than about the volume, and preferably not exceeding the volume of soluble oil injected, or these fluids can be injected as a series of alternate slugs of substantially anhydrous soluble oil and low-salt content water, wherein the volume of each slug of water is not more than about, and preferably does not exceed the volume of the immediately preceding slug of subtantially anhydrous soluble oil. This is followed by the injection of 0.01 to 0.03 pore volume of a water-external microemulsion. The injected fluids are displaced through the formation by injecting a substantially larger volume of thickened aqueous flooding medium followed by flood water or brine.

Although the exact mechanism by which pretreatment of the reservoir with aqueous alkali metal silicate solution operates to improve the efficiency of a micellar solution flood is not completely understood, it has nevertheless been demonstrated that improved oil recoveries are obtainable in reservoirs containing deleterious amounts of dissolved divalent metal salts, and reservoirs containing cation-exchangeable divalent metal ions, such as calcium, magnesium and barium. The process is also useful in heterogeneous reservoirs and in reservoirs containing anion absorptive constituents, such as clays. As a practical matter, most petroleum reservoirs contain at least some divalent metal ions and exhibit some heterogeneity and adsorptive capacity. Thus oil recoveries are improved in most naturally-occurring petroleum reservoirs.

Another benefit obtained with the process of this invention is that resistance to the flow of the micellar solution and subsequently injected aqueous drive fluid through the reservoir is reduced. Accordingly, fluid injections can be accomplished at lower pressures, or conversely higher injection rates can be obtained for the same pressure differential.

The invention is further described by the following examples which are illustrative of specific modes of practicing the invention and are not intended as limiting the scope of the invention as defined by the appended claims.

EXAMPLE 1

A series of laboratory tests are conducted to demonstrate the deleterious effect of cation-exchangeable calcium clay upon oil recovery and the improvement obtainable by pretreating the oil-bearing formation in accordance with the method of this invention. The cores employed in these tests are 1½-inch diameter × 6-foot long cylinders packed with a No. 16 sand marketed by the American Graded Sand Company or a mixture of No. 16 sand containing 1 weight percent of added calcium montmorillonite clay. Each sand pack is saturated with a synthetic brine containing 9.43 weight percent of total dissolved solids including 28,200 ppm of sodium ion, 4,870 ppm of calcium ion, and 1,190 ppm of magnesium ion. The pack is then saturated with a 37° API Texas crude oil and flooded to residual oil saturation with the synthetic brine.

The flooding operation is conducted by successively injecting a small amount of an aqueous pretreating agent, 0.03 pore volume of soluble oil, and 0.6 pore volume of an aqueous fresh water solution of a water-soluble polyacrylamide exhibiting a Brookfield viscosity of 35 cp at 6 rpm. The cores are then flooded with the synthetic brine until no more oil is produced, and oil recoveries determined. The flooding operations are conducted at a temperature of 75° F. The soluble oil employed in these tests is an oil-external microemulsion prepared by admixing 46.8 volume percent of the Texas crude oil, 11.6 volume percent of a mixture of oil-soluble and water-soluble alkyl aryl sulfonates marketed by the Sonneborn Division of Witco Chemical Company under the trademark TRS-12B, 1.6 volume percent of ethylene glycol monobutyl ether, and 40.0 volume percent of fresh water containing an added 6,000 ppm of sodium chloride. TRS-12B is a mixture of approximately 60 weight percent of mixed preferentially oil-soluble and preferably water-soluble alkyl aryl sulfonates exhibiting an average molecular weight of about 400–410, about 16 weight percent oil, about 20 weight percent water and about 3 weight percent of inorganic mineral salts. The water-soluble polyacrylamide is a partially hydrolyzed polyacrylamide marketed by the Dow Chemical Company under the trademark Pusher 700.

In tests 1A and 1B the pretreating agent is 0.03 pore volume of a 0.05 weight percent solution of Pusher 700 in fresh water, and the pretreating agent employed in Test 1C is 0.10 pore volume of an aqueous alkaline sodium silicate solution having a $Na_2O/SiO_2$ molar ratio of 2.0, and containing 0.8 weight percent of sodium silicate. The results of these tests are summarized in Table 1.

These tests show that the conventional soluble oil flooding process provides high oil recoveries in a substantially clay-free, non-heterogeneous system, such as the sand pack employed in test 1A. However, as demonstrated in test 1B, as little as 1 percent of calcium clay drastically reduces the efficiency of the recovery process. Test 1C shows that pretreatment with an alkaline metal silicate solution increases oil recovery, even in clay-containing systems.

EXAMPLE 2

A series of oil recovery tests are conducted to demonstrate the improved oil recovery obtained by pretreating a heterogeneous oil-bearing reservoir with an alkali metal silicate solution as compared with no pretreatment or pretreatment with other agents. The cores employed in these tests are 2-inch by 2-inch square by 4-foot long Dundee sandstone exhibiting water permeabilities of 1,400 to 3,000 md when free of oil and 200 to 400 md at residual oil saturation, and porosities in the range of 22.5 to 22.9 percent. Dundee cores are relatively heterogeneous and are known to adversely affect the flow of aqueous polymer and surfactant solutions. The cores are saturated with the synthetic brine employed in Example 1, then with a 37° API Texas crude oil, and flooded to residual oil saturation with the synthetic brine. In test 2C, the core is flushed with 30 pore volumes of 10 weight percent aqueous sodium chloride solution prior to saturation with oil to remove dissolved and cation-exchangeable calcium from the core.

The flooding operation is conducted by successively injecting a small amount of an aqueous pretreating agent, 0.03 pore volume of an aqueous fresh water solution containing 0.05 weight percent of Pusher 700 polymer, and 0.03 pore volume of soluble oil. Then an aqueous solution containing about 0.15 weight percent of Pusher 700 polymer dissolved in fresh water is injected until the cores produce no more oil. Oil recoveries are determined. The soluble oil employed in these tests is an oil-external microemulsion prepared by admixing 43.2 volume percent of a 37° API Texas crude oil; 7.4 volume percent of preferentially oil-soluble, surface active, alkyl aryl petroleum sulfonates marketed by the Sonneborn Division of Witco Chemical Company, Inc. under the trademark Petronate RHL; 5.4 volume percent of preferentially water-soluble, surface active, alkyl aryl petroleum sulfonates marketed by the Sonneborn Division of Witco Chemical Company, Inc. under the trademark Pyronate 30; 4.0 volume percent of ethylene glycol monobutyl ether; and 40.0 volume percent fresh water. Petronate RHL is an oil solution containing about 62 percent of mixed preferentially oil-soluble alkyl aryl sulfonates having an average molecular weight in the range of 490 to 510 and not more than about 5 percent water. Pyronate 30 is an aqueous solution containing 30 percent of preferentially water-soluble alkyl aryl sulfonates having an average molecular weight in the range of 330 to 350.

No pretreatment is employed in tests 2A and 2C. Pretreatment is accomplished in Test 2B by injection of

TABLE 1

| Test No. | Clay Content, Wt. % | Pretreating Agent | Residual Oil, % Pore Vol. | Oil Recovery, % of Residual |
|---|---|---|---|---|
| 1A | 0 | 0.03 pv of polymer solution | 28.8 | 81.8 |
| 1B | 1.0 | do | 26.3 | 63.4 |
| 1C | 1.0 | 0.10 pv of alkaline sodium silicate solution | 27.3 | 93.3 |

0.05 pore volume of an aqueous 5 weight percent solution of sodium hydroxide. In tests 2D and 2E, the watered-out cores are respectively treated with 0.05 pore volume of a 1.0 weight percent or a 5.0 weight percent aqueous sodium silicate solution having an $Na_2O/SiO_2$ molar ratio of 0.3. The results of these tests are summarized in Table 2.

These tests demonstrate the increased oil recovery obtainable from heterogeneous reservoirs by injecting an aqueous alkali metal silicate solution ahead of conventional soluble oil flood as compared to a similar flood with no pretreatment, and the superiority of this technique as compared with preinjection of aqueous sodium hydroxide solution.

EXAMPLE 3

This example demonstrates the increased oil recovery obtainable by pretreatment with aqueous alkaline alkali metal silicate solutions ahead of a conventional soluble oil flood. These tests are conducted substantially in accordance with the method employed in Example 2. After flooding to residual oil saturation with synthetic brine, the cores are pretreated by injecting an aqueous alkaline solution containing an alkaline sodium silicate, and having an $Na_2O/SiO_2$ ratio of 2.0. In test 3A, the pretreatment consists of 0.05 pore volume of a 1.1 weight percent solution followed by 0.03 pore volume of fresh water; and in test 3B, 0.10 pore volume of a 2.2 weight percent solution is employed, followed by injection of 0.03 pore volume of a 0.05 weight percent solution of Pusher 700 polymer. The results of these tests are summarized in Table 2.

These tests show that the oil recovery from the difficult Dundee sandstone obtainable by soluble oil flooding is increased by pretreatment with an aqueous alkaline alkali metal silicate solution, as compared to that obtained in Example 2 with no pretreatment or pretreatment with other pretreating agents. Also, this example demonstrates the superiority of aqueous alkaline sodium silicate solutions for pretreatment as compared to the aqueous sodium silicate solutions employed in Example 2.

EXAMPLE 4

This example illustrates the synergistic effect of the combination of pretreatment of an oil-bearing formation with an aqueous alkaline alkali metal silicate solution followed by injection of a micellar solution. A 2-inch by 2-inch square by 4-foot long Dundee sandstone core similar to those employed in Example 2 is used in this test. The core is saturated with synthetic brine, then with crude oil, and flooded to residual oil saturation by the procedure described in Example 1.

This test is conducted by injecting 0.10 pore volume of an aqueous alkaline solution containing 2.2 weight percent of an alkaline sodium silicate, and having a $Na_2O/SiO_2$ ratio of 2.0. The core is then water flooded by injection fresh water until no more oil is produced. Less than 1 percent of the residual oil is recovered by this technique. Pretreatment with alkali metal silicate followed by water flooding does not recover residual oil. Yet, pretreatment followed by micellar solution flooding effects recovery of substantial amounts of the residual oil.

EXAMPLE 5

This example demonstrates the increase in the amount of residual oil recoverable from a heterogeneous formation by flooding with a water-external microemulsion preceded by an aqueous alkaline alkali metal silicate solution. The cores employed in these tests are 2-inch by 2-inch × 4-foot long Dundee sandstone similar to those employed in Example 2. The cores are saturated with synthetic brine, then with crude oil, and flooded to residual oil saturation by the procedure described in Example 1.

The flooding operation is conducted by successively injecting a small amount of an aqueous pretreating agent, 0.03 pore volume of a water-external microemulsion, 0.60 pore volume of an aqueous fresh water solution containing 0.15 weight percent of Pusher 700 polymer. The cores are then flooded with fresh water until no more oil is produced, and oil recoveries determined. The water-external microemulsion is prepared by admixing 15 volume percent of a 37° API Texas crude oil; 71.8 volume percent of fresh water to which 6,000 ppm of sodium chloride has been added, 1.6 volume percent of ethylene glycol monobutyl ether, and 11.6 volume percent of Sonneborn TRS-12B sulfonate.

In test 5A, the pretreatment consists of injecting 0.05 pore volume of an aqueous 0.05 weight percent solution of Pusher 700. The pretreating agent employed in test 5B is 0.10 pore volume of an aqueous alkaline solution containing 1.1 weight percent of an alkaline sodium silicate, and having a $Na_2O/SiO_2$ molar ratio of 2.0, followed by 0.02 pore volume of fresh water. The results of these tests are summarized in Table 2.

EXAMPLE 6

This example demonstrates the increased oil recovery obtainable from an oil-bearing reservoir by pretreatment with an aqueous alkaline alkali metal silicate solution followed by a conventional soluble oil flood in which small slugs of substantially anhydrous soluble oil and water are alternately injected into the reservoir. The cores employed in these tests are 2-inch by 2-inch by 4-foot long Dundee sandstone similar to those employed in Example 2. The cores are saturated with synthetic brine, then with crude oil, and flooded to residual oil saturation by the procedure described in Example 1.

The flooding operation is conducted by successively injecting a small amount of an aqueous pretreating agent, 0.16 pore volume of a substantially anhydrous soluble oil, small slugs of which are alternately injected with small slugs of fresh water, followed by injection of an aqueous solution of Pusher 700 polymer dissolved in fresh water. Polymer solution injection is continued until no more oil is produced, and oil recoveries determined. The substantially anhydrous soluble oil is prepared by admixing 64.8 volume percent of 37° API Texas crude oil; 11.1 volume percent of a mixture of preferentially oil-soluble alkyl aryl sulfonates marketed by the Sonneborn Division of Witco Chemical Company, Inc. under the trademark Petronate CR; 8.1 volume percent of a mixture of preferentially water-soluble alkyl aryl sulfonates marketed by Sonneborn under the trademark Pyronate 30; 6.0 volume percent ethylene glycol monobutyl ether, and 10.0 volume percent of fresh water. Petronate CR is an oil solution containing about 62 percent of alkyl aryl sodium sulfonates having an average molecular weight in the range of 490 to 510 and up to 5 percent water. Pyronate 30 is an aqueous solution containing 30 percent alkyl aryl petroleum sulfonates having an average molecular weight in the range of 330 to 350, about 10 percent mineral oil and about 10 percent inorganic salts.

In test 6A, the pretreating agent is 0.03 pore volume of an aqueous fresh water solution containing 0.05 weight percent of Pusher 700 polymer. In test 6B, the core is pretreated by injecting 0.05 pore volume of an aqueous alkaline solution containing 1.1 weight percent of sodium silicate, and having an $Na_2O/SiO_2$ ratio of 2.0. The results of these tests are summarized in Table 2.

solution, followed by injection of an aqueous polymer solution containing 0.15 weight percent of Pusher 700 polymer dissolved in fresh water. Polymer solution injection is continued until no more oil is produced, and oil recoveries determined. The aqueous micellar surfactant solution is prepared by admixing 86.8 volume percent fresh water containing 6,000 ppm of added sodium chloride, 11.6 volume percent of Sonneborn TRS-12B sulfonate, and 1.6 volume percent of ethylene glycol monobutyl ether.

TABLE 2

SUMMARY OF TEST RESULTS
DUNDEE SANDSTONE

| Test No. | Pretreatment Agent | Pore Vol. | Residual Oil % Pore Vol. | Oil Recovery, % of Residual Oil |
|---|---|---|---|---|
| 2A | None | | 34.6 | 29.6 |
| 2B | 5% NaOH solution | 0.05 | 32.1 | 29.2 |
| 2C | None[1] | — | 30.7 | 38.1 |
| 2D | 1.0% sodium silicate solution | 0.05 | 30.3 | 47.8 |
| 2E | 5.0% sodium silicate solution | 0.05 | 29.6 | 62.4 |
| 3A | 1.1% alkaline sodium silicate solution | 0.05 | 30.0 | 75.1 |
| 3B | 2.2% alkaline sodium silicate solution | 0.10 | 32.4 | 84.4 |
| 4 | 2.2% alkaline sodium silicate solution | 0.10 | 31.7 | <1 |
| 5A | 0.05% Pusher 700 solution | 0.05 | 28.7 | 52.5 |
| 5B | 1.1% alkaline sodium silicate solution[2] | 0.10 | 32.1 | 79 |
| 6A | 0.05% Pusher 700 solution | 0.03 | 31.5 | 47.6 |
| 6B | 1.1% alkaline sodium silicate solution | 0.05 | 32.8 | 75.6 |

[1]Core flushed with 30 pore volumes of an aqueous 10 weight percent sodium chloride solution prior to saturation with oil.
[2]Followed by injection of 0.02 pore volume of fresh water.

EXAMPLE 7

This example demonstrates the increased oil recovery obtainable from an oil-bearing reservoir by pretreatment with an aqueous alkaline alkali metal silicate solution ahead of a conventional aqueous micellar surfactant solution. The cores employed in these tests are 1½-inch square by 2-foot long Berea sandstone. Each core is first saturated with a produced brine from the Adena Field in Colorado, then with 42° API crude oil from the same field. The cores are then flooded with Adena brine to residual oil saturation. Adena produced water contains about 6,300 ppm of total dissolved solids, 270 ppm of calcium ion, and 2,275 ppm of sodium ion.

The flooding operation is then conducted by injecting 0.03 pore volume of an aqueous micellar surfactant The core is not pretreated in test 7A. In test 7B, the core is pretreated by injecting 0.10 pore volume of an aqueous alkaline solution containing 1.0 weight percent of alkali metal silicate, and having a $Na_2O/SiO_2$ ratio of 2.0. The results of these tests are sumarized in Table 3.

TABLE 3

SUMMARY OF THE TEST RESULTS
BEREA SANDSTONE

| Test No. | Pretreatment Agent | Pore Vol. | Residual Oil % Pore Vol. | Oil Recovery, % of Residual Oil |
|---|---|---|---|---|
| 7A | None | — | 34.6 | 52.3 |
| 7B | 1.0% alkaline silicate solution | 0.10 | 37.4 | 63.2 |

EXAMPLE 8

This example illustrates the increased injection rate obtainable by pretreating a petroleum reservoir with aqueous alkali metal silicate solution prior to conducting a micellar solution flood. These tests are conducted substantially in accordance with the method employed in Example 2.

No pretreatment is employed in test 8A. In test 8B, pretreatment is accomplished by injecting 0.05 pore volume of an aqueous 1.0 weight percent solution of sodium silicate, and having an $Na_2O/SiO_2$ molar ratio of 0.3, and in test 8C by injecting 0.10 pore volume of an aqueous alkaline 2.2 weight percent solution of sodium silicate, and having a molar ratio of 2.0. Each test is completed by injecting 0.03 pore volume of an aqueous fresh water solution containing 0.05 weight percent of Pusher 700 polymer, followed by 0.03 pore volume of water-containing soluble oil. Then an aqueous solution containing about 0.15 weight percent of Pusher 700 polymer dissolved in fresh water is injected until the cores produce no more oil. Injection rates and pressures are recorded throughout the tests, and flow rates per unit of pressure drop calculated. These data are summarized in Table 4.

TABLE 4

| Test 8A<br>No Pretreatment | | Test 8B<br>Sodium Silicate Solution<br>Pretreatment | | Test 8C<br>Alkaline Sodium<br>Silicate Solution<br>Pretreatment | |
|---|---|---|---|---|---|
| Pore Vol.<br>Injected | Flow Rate,<br>cc/min/psi | Pore Vol.<br>Injected | Flow Rate,<br>cc/min/psi | Pore Vol.<br>Injected | Flow Rate,<br>cc/min/psi |
| 0.37 | 0.022 | 0.59 | 0.029 | 0.65 | 0.029 |
| 0.43 | 0.019 | 0.79 | 0.035 | 0.80 | 0.050 |
| 0.57 | 0.019 | 0.92 | 0.030 | 0.94 | 0.041 |
| 0.86 | 0.006 | 1.06 | 0.025 | 1.22 | 0.044 |
| 1.00 | 0.009 | 1.19 | 0.040 | 1.36 | 0.031 |
| 1.01 | 0.007 | 1.32 | 0.043 | 1.50 | 0.044 |

These tests show that although the initial injection rates are fairly comparable, injection rates per unit of pressure drop are substantially increased by pretreatment of the core with an aqueous sodium silicate or aqueous alkaline sodium silicate solution.

EXAMPLE 9

This example demonstrates the increased oil recovery obtainable by pretreating a clay-containing, oil-bearing formation in accordance with the method of this invention. The cores employed in these tests are 1½-inch diameter by 6-foot long cylinders packed with a mixture of No. 16 sand marketed by the American Graded Sand Company and 0.5 weight percent of halloysite clay.

Each sand pack is saturated with a synthetic brine containing 0.07 weight percent of total dissolved solids including 86 ppm of sodium ion, 86 ppm of calcium ion, and 23 ppm of magnesium ion. The pack is then saturated with a 39.7° API Montana crude oil and flooded to residual oil saturation with the synthetic brine The flooding operation of test 9A is conducted by injecting 0.014 pore volume of an oil-external soluble oil, followed by injection of 0.016 pore volume of a water-external microemulsion. The slugs are then driven through the reservoir by an aqueous fresh water solution of a water-soluble polyacrylamide exhibiting a Brookfield viscosity of 30 cp at 6 rpm. The cores are then flooded with fresh water until no more oil is produced, and oil recoveries determined. The flooding operations are conducted at a temperature of 70° F.

The oil-external soluble oil employed in this test is prepared by admixing 33.7 volume percent of a 39.7° API Montana crude oil; 6.1 volume percent of preferentially oil-soluble, surface active, alkyl aryl petroleum sulfonates marketed by the Sonneborn Division of Witco Chemical Company, Inc. under the trademark Petronate RHL; 3.8 volume percent of preferentially water-soluble, surface active, alkyl aryl petroleum sulfonates marketed by the Sonneborn Division of Witco Chemical, Inc. under the trademark Pyronate 30; 1.4 volume percent of ethylene glycol monobutyl ether marketed by Union Carbide Company under the trademark butyl Cellosolve; and 55.0 volume percent of fresh water containing 1000 ppm of sodium chloride. Petronate RHL is an oil solution containing about 62 percent of mixed preferentially oil-soluble alkyl aryl sulfonates and not more than about 5 percent water. Pyronate 30 is an aqueous solution containing 30 percent of preferentially water-soluble alkyl aryl sulfonates having an average molecular weight in the range of 330 to 350 and containing about 50 percent water.

The water-external microemulsion is prepared by admixing 3.9 volume percent of the 39.7° API Montana crude oil; 6.1 volume percent of Petronate RHL; 3.8 volume percent of Pyronate 30; 1.4 volume percent of butyl Cellosolve; and 84.8 volume percent fresh water containing 800 ppm of a polyacrylamide marketed by Nalco Chemical Company under the trademark Q-41-F, and 1000 ppm of sodium chloride.

The viscosities of the oil-external and water-external microemulsions injected were 23 and 20 cp, respectively.

In test 9A, no pretreating agent is used. In test 9B, the same injection procedure is used after the core is pretreated by injecting 0.05 pore volume of an aqueous alkaline solution containing 1 weight percent of sodium silicate, and having an $Na_2O/SiO_2$ molar ratio of 2. The results of these tests which are summarized in Table 5, show the increased oil recovery obtained with pretreatment of the clay-containing, oil-bearing formation.

EXAMPLE 10

This example demonstrates the more economical yet equally efficient oil recovery obtainable by a preferred embodiment of this invention. The flooding operation of test 10 is identical to that of test 9B, except that the two slugs of 9B are replaced with a single oil-external soluble oil slug of 0.03 pore volume having the same composition as the oil-external soluble oil employed in test 9B; and the viscous water drive exhibits Brookfield viscosity of 34 at 6 rpm.

The results of test 10 are summarized in Table 5 and show that a flooding process using less oil, i.e., test 9B is able to achieve oil recovery comparable to a flooding process using more oil i.e. test 10.

TABLE 5

| Test No. | Pretreatment Agent | NO. 16 SAND Pore Vol. | Residual Oil % Pore Vol. | Oil Recovery % of Residual Oil |
|---|---|---|---|---|
| 9A | None | — | 22.4 | 60.0 |
| 9B | 1.0% alkaline sodium silicate solution | 0.05 | 25.3 | 93.7 |
| 10 | 1.0% alkaline sodium silicate solution | 0.05 | 23.4 | 92.6 |

EXAMPLE 11

This example illustrates the practice of this invention in a subterranean petroleum reservoir. The flooding operation is conducted by successively injecting a slug of an aqueous pretreating agent, a slug of a substantially anhydrous soluble oil, and a slug of a water-external microemulsion, followed by the injection of thickened flood water.

The oil-bearing petroleum reservoir is first pretreated with 0.05 pore volume of a 1 weight percent aqueous alkaline sodium silicate solution having a $Na_2O/SiO_2$ molar ratio of 2. The pretreatment slug is followed by 0.015 pore volume of a substantially anhydrous soluble oil. The substantially anhydrous soluble oil is prepared by admixing 64.8 volume percent of 37° API Texas crude oil; 11.1 volume percent of a mixture of preferentially oil-soluble alkyl aryl sulfonates marketed by the Sonneborn Division of Witco Chemical Company, Inc. under the trademark Petronate RHL; 8.1 volume percent Pyronate 30; 6.0 volume percent of butyl Cellosolve; and 10.0 volume percent of fresh water.

The water-external microemulsion is prepared by admixing 3.9 volume percent of the 37° API Texas crude; 6.1 volume percent of the Petronate RHL; 3.8 volume percent of the Pyronate 30; 1.4 volume percent of the butyl Cellosolve; and 84.8 volume percent of fresh water containing 820 ppm of a polyacrylamide.

Then the reservoir is flooded with a aqueous fresh water solution of a water-soluble polyacrylamide. The water-soluble polyacrylamide is a partially hydrolyzed polyacrylamide marketed by the Dow Chemical Company under the trademark Pusher 700.

EXAMPLE 12

This example illustrates another mode of practicing the improved oil recovery process of the present invention. A flooding operation is conducted in a manner similar to that described in Example 11, except that the one slug of substantially anhydrous soluble oil is replaced by the injection of a 0.007 pore volume slug of substantially anhydrous soluble oil and followed by the injection of 0.007 pore volume of fresh water containing 2,500 ppm of sodium chloride.

EXAMPLE 13

This example illustrates a preferred sequence of injections and is conducted to demonstrate the improved efficiency and economy of a preferred embodiment of this invention.

This test is initiated by injecting 0.10 pore volume of an aqueous alkaline solution containing 1.0 weight percent of sodium silicate, and having a $Na_2O/SiO_2$ molar ratio of 2.

The remainder of the flooding operation is conducted by successively injecting a total of 0.007 pore volume of substantially anhydrous soluble oil, small slugs of which are alternately injected with slugs of salt-containing fresh water of a volume equal to the immediately preceding soluble oil slug, followed by injection of 0.016 pore volume of a water-external microemulsion. The slugs are then driven through the reservoir by thickened flood water.

The substantially anhydrous soluble oil is prepared by admixing 66 volume percent of 40.7° API Montana crude oil; 23.4 volume percent of a mixture of oil-soluble and water-soluble alkyl aryl sulfonates marketed by Sonneborn under the trademark TRS-12B; 2.6 volume percent of butyl Cellosolve; and 8.0 volume percent of fresh water containing 1000 ppm of sodium chloride. TRS-12B is a mixture of approximately 60 weight percent of mixed preferentially oil-soluble and preferentially water-soluble alkyl aryl sulfonates, about 16 weight percent oil, about 20 weight percent water and about 4 weight percent of inorganic salts.

The water-external microemulsion is prepared by admixing 83.6 volume percent of fresh water containing 1000 ppm of sodium chloride and 900 ppm of Pusher 700; 11.0 volume percent of TRS-12B; 1.5 volume percent of butyl Cellosolve; and 3.9 volume percent of 40.7° API Montana crude oil.

The final injection is thickened floodwater to drive the slugs through the reservoir.

Various embodiments and modifications of this invention have been described in the foregoing description and examples, and further modifications will be apparent to those skilled in the art. Such modifications are included within the scope of this invention as defined by the following claims.

Having now described the invention, I claim:

1. In the method for recovering petroleum from a subterranean reservoir in which a micellar solution is injected into the reservoir through an injection well in communication therewith, and thereafter an aqueous flooding medium is injected to drive the micellar solution towards one or more spaced production wells from which fluids are recovered, the improvement which comprises injecting into said reservoir prior to the injection of said micellar solution an aqueous alkaline alkali metal silicate pretreating solution having a $M_2O/SiO_2$ molar ratio of between about 1 and 4, wherein M is an alkali metal atom.

2. The method defined in claim 1 wherein about 0.01 to 0.5 pore volume of said pretreating solution is injected into said reservoir.

3. The method defined in claim 1 wherein said pretreating solution contains less than about 5 weight percent of alkali metal silicate.

4. The method defined in claim 1 wherein said aqueous alkaline alkali metal silicate pretreating solution has a $M_2O/SiO_2$ molar ratio of between about 1.5 and 2.5.

5. The method defined in claim 1 wherein the injection of said micellar solution comprises injecting successively an oleaginous micellar solution followed by a water-external microemulsion.

6. The method defined in claim 1 wherein the injection of said micellar solution comprises injecting successively an oleaginous micellar solution followed by an aqueous-external micellar solution.

7. A method for recovering petroleum from a subterranean reservoir penetrated by an injection well and at least one production well spaced apart in the reservoir, which comprises:
  injecting about 0.01 to 0.5 pore volume of an aqueous alkaline alkali metal silicate pretreating solution having a $M_2O/SiO_2$ molar ratio of between about 1.5 and 2.5, wherein M is an alkali metal atom, and said solution containing less than about 5 weight percent of alkali metal silicate;
  next injecting 0.01 to 0.15 pore volume of a micellar solution;
  thereafter injecting an aqueous flooding medium to drive the micellar solution towards a spaced production well; and
  recovering petroleum from said production well.

8. The method defined in claim 7 wherein said alkali metal silicate is sodium or potassium silicate.

9. The method defined in claim 7 wherein at least an initial portion of said aqueous flooding medium is increased in viscosity by the addition of a thickening agent.

10. The method defined in claim 9 wherein said thickening agent is a water-soluble partially hydrolyzed polyacrylamide.

11. The method defined in claim 7 wherein said micellar solution is a substantially anhydrous soluble oil.

12. The method defined in claim 7 wherein said micellar solution is a soluble oil containing water present in the form of a water-in-oil microemulsion.

13. The method defined in claim 7 wherein said micellar solution is a water-external microemulsion.

14. The method defined by claim 7 wherein said micellar solution is an aqueous micellar surfactant solution.

15. The method defined by claim 7 wherein said micellar solution comprises a first portion of an oleaginous micellar solution followed by a second portion of a water-external microemulsion.

16. A method for recovering petroleum from a subterranean reservoir penetrated by an injection well and a production well spaced apart in the reservoir, which comprises:
  injecting about 0.01 to 0.5 pore volume of an aqueous alkaline sodium or potassium silicate pretreating solution having a $M_2O/SiO_2$ molar ratio of between about 1.5 and 2.5, wherein M is a sodium or potassium atom, and said solution containing about 0.1 to 3 weight percent of sodium or potassium silicate;
  injecting 0.01 to 0.15 pore volume of a soluble oil comprising a mixture of 30 to 90 volume percent of liquid hydrocarbon, 0.5 to 8 volume percent of an organic liquid stabilizing agent, 4 to 30 volume percent of a mixture of preferentially oil-soluble surface active alkyl aryl sulfonates and preferentially water-soluble surface active alkyl aryl sulfonates, and 0 to about 50 volume percent of water present in the form of a water-in-oil microemulsion, said sulfonates being present in the proportion of about 1 to 15 parts by weight of oil-soluble sulfonate per part of water-soluble sulfonate;
  thereafter injecting an aqueous flooding medium to drive the soluble oil towards said spaced production well, at least an initial portion of said aqueous flooding medium being increased in viscosity by the addition of a water-soluble polymer, and
  recovering petroleum from said well.

17. The method defined in claim 16 wherein said soluble oil is substantially anhydrous and wherein small slugs of said soluble oil and water are alternately injected into the reservoir.

18. A method for recovering petroleum from a subterranean reservoir penetrated by an injection well and at least one production well spaced apart in the reservoir, which comprises:
  injecting about 0.01 to 0.5 pore volume of an aqueous alkaline sodium or potassium silicate pretreating solution having a $M_2O/SiO_2$ molar ratio of between about 1.5 and 2.5, wherein M is a sodium or potassium atom, and said solution containing about 0.1 to 3 weight percent of sodium or potassium silicate;
  injecting 0.005 to 0.05 pore volume of an oleaginous micellar solution comprising a mixture of 30 to 90 volume percent of liquid hydrocarbon, 0.5 to 8 volume percent of an organic liquid stabilizing agent, 4 to 30 volume percent of a mixture of preferentially oil-soluble surface active alkyl aryl sulfonates and preferentially water-soluble surface active alkyl aryl sulfonates, and 0 to about 50 volume percent of water, present in the form of a water-in-oil microemulsion, said sulfonates being present in the proportion of about 1 to 15 parts by weight of oil-soluble sulfonates per part of water-soluble sulfonates;
  injecting 0.005 to 0.05 pore volume of a water-external microemulsion comprising a mixture of 75 to 90 volume percent of water, not more than about 8 percent of an organic liquid stabilizing agent, 2 to 20 volume percent of a mixture of preferentially oil-soluble surface active alkyl aryl sulfonates and preferentially water-soluble surface active alkyl aryl sulfonates, and not more than about 25 volume percent of oil present in the form of an oil-in-water microemulsion, said sulfonates being present in the proportion of about 1 to 15 parts by weight of oil-soluble sulfonates per part of water-soluble sulfonates;
  thereafter injecting an aqueous flooding medium to drive the previously injected fluids towards said spaced production well, at least an initial portion of said aqueous flooding medium being increased in viscosity by the addition of a water-soluble polymer, and
  recovering petroleum from said well.

19. The method defined in claim 18 wherein said oleaginous micellar solution is a substantially anhydrous soluble oil and wherein said substantially anhydrous soluble oil is injected into the reservoir in one or more slugs, each of said slugs being followed by the injection of a slug of water in an amount not more than about the volume of the immediately preceding slug of oleaginous micellar solution.

20. The method defined in claim 18 wherein said water-external microemulsion is increased in viscosity by the addition of a thickening agent.

* * * * *